United States Patent
Chudgar et al.

(10) Patent No.: US 8,732,351 B1
(45) Date of Patent: May 20, 2014

(54) SYSTEM AND METHOD FOR PACKET SPLITTING

(75) Inventors: Keyur Chudgar, Santa Clara, CA (US); Satish Sathe, San Ramon, CA (US); Vinay Ravuri, Cupertino, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 768 days.

(21) Appl. No.: 12/917,425

(22) Filed: Nov. 1, 2010

Related U.S. Application Data

(63) Continuation-in-part of application No. 12/756,128, filed on Apr. 7, 2010.

(51) Int. Cl.
*G06F 13/28* (2006.01)

(52) U.S. Cl.
USPC .............................................. 710/22; 370/392

(58) Field of Classification Search
None
See application file for complete search history.

(56) References Cited

U.S. PATENT DOCUMENTS

| | | | |
|---|---|---|---|
| 5,446,738 A * | 8/1995 | Kim et al. ................ | 370/395.42 |
| 6,721,316 B1 * | 4/2004 | Epps et al. .................... | 370/389 |
| 6,724,761 B1 * | 4/2004 | Moy-Yee et al. ............. | 370/390 |
| 6,804,243 B1 | 10/2004 | Humphrey et al. | |
| 7,215,670 B1 | 5/2007 | Karlsson et al. | |
| 7,668,160 B2 | 2/2010 | Narayan et al. | |
| 7,688,820 B2 | 3/2010 | Forte et al. | |
| 7,813,346 B1 | 10/2010 | Kuwabara et al. | |
| 7,890,297 B2 * | 2/2011 | Di Palmi et al. ............. | 702/182 |
| 2004/0057434 A1 * | 3/2004 | Poon et al. .................... | 370/392 |
| 2007/0223389 A1 * | 9/2007 | Basso et al. ................... | 370/252 |
| 2013/0114413 A1 * | 5/2013 | Song et al. .................... | 370/237 |

* cited by examiner

*Primary Examiner* — Elias Mamo
(74) *Attorney, Agent, or Firm* — Amin, Turocy & Watson, LLP

(57) ABSTRACT

A data structure splitting method is provided for processing data using a minimum number of memory accesses. An SoC is provided with a with a central processing unit (CPU), a system memory, an on-chip memory (OCM), and a network interface including an embedded direct memory access (DMA). The network interface accepts a data structure with a header and a payload. The DMA writes the payload in the system memory, and the header in the OCM. The network interface DMA notifies the CPU of the header address in the OCM. The CPU reads the header in the OCM, performs processing instructions, and writes the processed header in the OCM. The CPU sends the address of the processed header in OCM to the network interface DMA. The network interface DMA reads the processed header from the OCM and sends a data structure with the processed header and the payload.

20 Claims, 3 Drawing Sheets

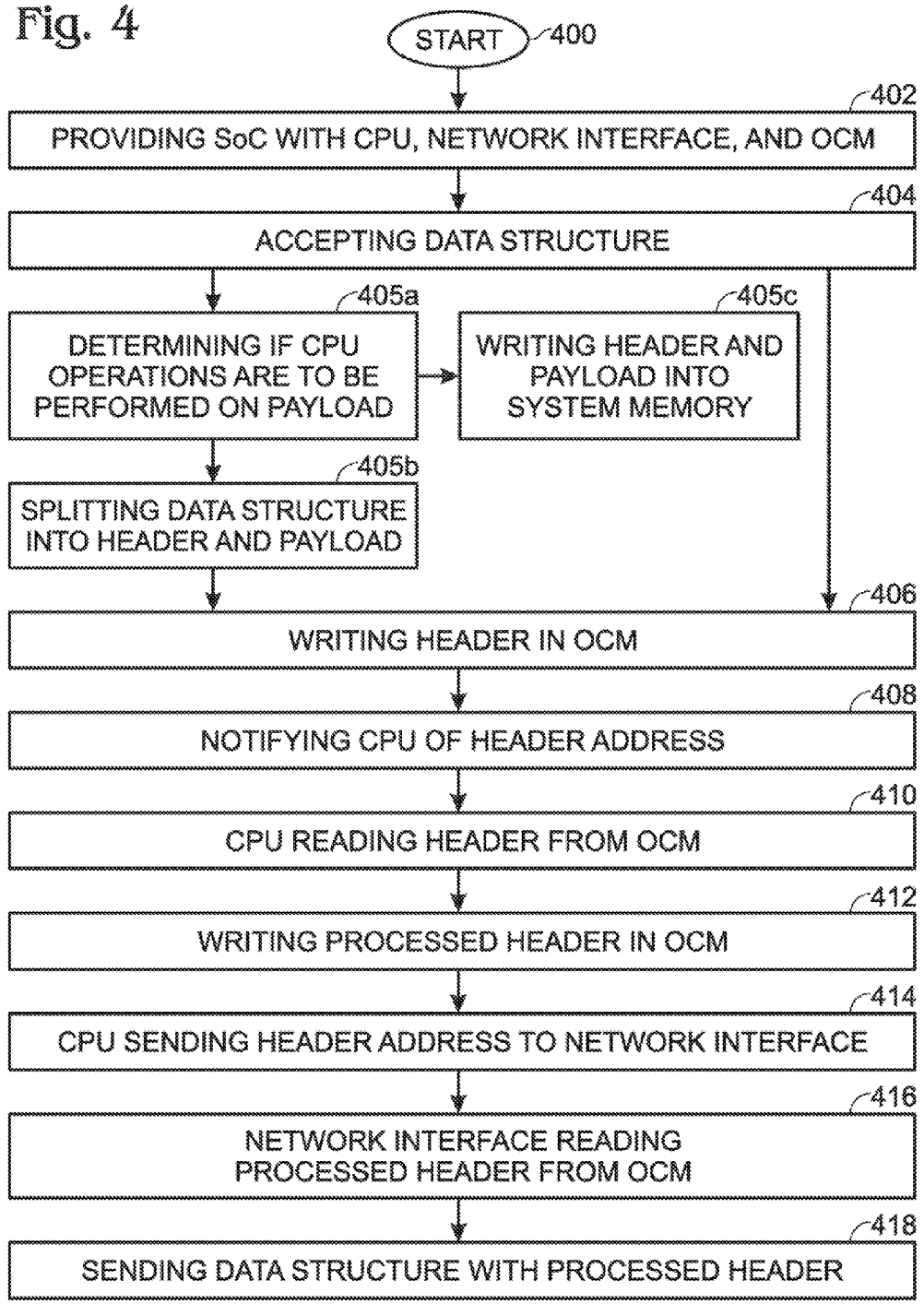

SYSTEM AND METHOD FOR PACKET SPLITTING

RELATED APPLICATIONS

This application is a Continuation-in-Part of a patent application entitled, MULTI-PROCESSOR SYSTEM-ON-CHIP WITH DYNAMIC PACKET PROCESSING LOAD CONTROL, invented by Keyur Chudgar et al, Ser. No. 12/756,128, filed Apr. 7, 2010, which is incorporated herein by reference.

BACKGROUND OF THE INVENTION

1. Field of the Invention

This invention generally relates to computer processing and, more particularly, to a system and method for processing packets with a reduced number of memory accesses.

2. Description of the Related Art

As noted in Wikipedia, direct memory access (DMA) is a feature of modern computers and microprocessors that allows certain hardware subsystems within the computer to access system memory for reading and/or writing independently of the central processing unit (CPU). Many hardware systems use DMAs, including disk drive controllers, graphics cards, network cards and sound cards. DMA is also used for intra-chip data transfer in multi-core processors, especially in multiprocessor system-on-chips (SoCs), where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly a processing element inside a multicore processor can transfer data to and from its local memory without occupying its processor time, thus permitting computation and data transfer concurrency.

Without DMA, using programmed input/output (PIO) mode for communication with peripheral devices, or load/store instructions in the case of multicore chips, the CPU is typically fully occupied for the entire duration of the read or write operation, and is thus unavailable to perform other work. With DMA, the CPU can initiate the transfer, do other operations while the transfer is in progress, and receive an interrupt from the DMA controller once the operation has been done. This is especially useful in real-time computing applications where not stalling behind concurrent operations is critical. Another and related application area is various forms of stream processing where it is essential to have data processing and transfer in parallel, in order to achieve sufficient throughput.

A DMA transfer copies a block of memory from one device to another. While the CPU initiates the transfer by issuing a DMA command, it does not execute it. For so-called "third party" DMA, as is normally used with the ISA bus, the transfer is performed by a DMA controller which is typically part of the motherboard chipset. More advanced bus designs such as PCI typically use bus mastering DMA, where the device takes control of the bus and performs the transfer itself. In an embedded processor or multiprocessor system-on-chip, it is a DMA engine connected to the on-chip bus that actually administers the transfer of the data, in coordination with the flow control mechanisms of the on-chip bus.

A typical usage of DMA is copying a block of memory from system RAM to or from a buffer on the device. Such an operation usually does not stall the processor, which as a result can be scheduled to perform other tasks unless those tasks include a read from or write to memory. DMA is essential to high performance embedded systems. It is also essential in providing so-called zero-copy implementations of peripheral device drivers as well as functionalities such as network packet routing, audio playback, and streaming video. Multicore embedded processors (in the form of multiprocessor system-on-chip) often use one or more DMA engines in combination with scratchpad memories for both increased efficiency and lower power consumption. In computer clusters for high-performance computing, DMA among multiple computing nodes is often used under the name of remote DMA.

A general purpose programmable DMA controller is a software-managed programmable peripheral block charged with moving or copying data from one memory address to another memory address. The DMA controller provides a more efficient mechanism to perform large data block transfers, as compared to a conventional general purpose microprocessor. The employment of DMA controllers frees up the processor and software to perform other operations in parallel. Instruction sequences for the DMA, often referred to as control descriptors (CDs or descriptors), are set up by software and usually include a source address, destination address, and other relevant transaction information. A DMA controller may perform other functions such as data manipulations or calculations.

Control descriptors are often assembled in groups called descriptor sequences or rings. Typically, the software control of a DMA controller is enabled through a device specific driver. The device driver is responsible for low level handshaking between upper layer software and the hardware. This device driver manages the descriptor rings, communicates with the DMA controller when work is pending, and communicates with upper layer software when work is complete.

The use of a DMA can lead to cache coherency problems. A CPU equipped with a cache and an external memory can be accessed directly by devices using DMA. When the CPU accesses location X in the memory, the current value is stored in the cache. Subsequent operations on X update the cached copy of X, but not the external memory version of X. If the cache is not flushed to the memory before the next time a device tries to access X, the device receives a stale value of X. Similarly, if the cached copy of X is not invalidated when a device writes a new value to the memory, then the CPU operates on a stale value of X.

This issue can be addressed in one of two ways in system design: Cache-coherent systems implement a method in hardware whereby external writes are signaled to the cache controller which then performs a cache invalidation for DMA writes, or cache flush for DMA reads. Non-coherent systems leave this to software, where the OS must then ensure that the cache lines are flushed before an outgoing DMA transfer is started and invalidated before a memory range affected by an incoming DMA transfer is accessed. The OS must make sure that the memory range is not accessed by any running threads in the meantime. The latter approach introduces some overhead to the DMA operation, as most hardware requires a loop to invalidate each cache line individually.

Communication systems in a wide variety of market segments, such as packet processing routers, wireless access points, wireless base stations, media gateways, networked access storage devices, cloud computing, and many more, need to support fast packet processing. To that end, CPU speeds have significant improved over the years. Today CPUs run as fast as 2.0 GHz, and multiple CPUs are available to process a packet in single chip. The problem is that the performance of memory technology has not kept pace. Even with multiple powerful CPUs to process packets, memory access latency has become the bottleneck in packet processing.

To improve memory access, the industry has evolved to a fast L2 cache implementation. Instead of accessing data in system memory, a cache controller can bring this data in the cache, making it much faster for CPU access. However, the CPU can only access a packet header after the header is loaded into cache, until then, the CPU must wait for data to be available in the cache. On top of that, many applications require the actual packet data, so that out-of-order execution is not possible.

The cache based solution is limited. It works well only when the data is already in cache before the CPU attempts access. But to share the data between CPU and other hardware devices, the memory address must be made coherent. To make the memory address coherent, a snooping algorithm needs to run for every access to memory. This results in performance penalty, as each access must snoop the system bus to find the latest copy of the data at a particular address. The snooping takes as long as 30 to 40 CPU cycles.

Further, when the hardware needs to access cached data, the snooping algorithm generally flushes the data back to system memory and invalidates the cache for this address. This results even in more performance penalties, as the data needs to be written to system memory first, and then needs to be read by hardware from system memory. On top of that, cache invalidation logic also needs to run.

Overall, the following latencies need to be considered for complete packet processing and forwarding:

Latency 1: A packet arrives at an Ethernet Medium Access Control (MAC) hardware interface. The Ethernet MAC hardware uses the DMA to send the data to system memory (i.e. Double Data Rate (DDR) memory) from an internal first-in first-out (FIFO) memory.

Latency 2: The CPU tries to access packet header for packet processing. There is a cache miss for this access, and system memory is accessed to bring the packet header to cache. When the CPU is done processing the packet, it sends the Ethernet MAC an indication that it is the sent out. At this time nothing happening, as cache is configured as write back.

Latency 3: The Ethernet MAC hardware tries to access this data from memory. As data was cached, the snooping logic flushes the data from cache to DDR, and invalidates the cache. So, there is a latency in copying data from cache to DDR.

Latency 4: The Ethernet MAC uses the DMA to send the data from the DDR to its internal FIFO for egress. Here also, the DDR needs to be accessed.

It would be advantageous if system memory access latencies, such as bus snoop logic, cache flush, and invalidation logic could be minimized in packet processing.

SUMMARY OF THE INVENTION

Disclosed herein are a system and method that minimize system memory accesses in packet processing. Initially, the packet is arranged in multiple fragments to be processed by a central processing unit (CPU). The packet header portion of the packet is made available to CPU as fast as possible, eliminating the need to access the header from the slower external memory, and resulting in a significant performance improvement. The system and method are not limited to just packet processing, and has application to any data structure where only a portion of the structure can be processed from a dedicated on-chip memory.

Advantageously, only the header portion of the packet is completely processed from the on-chip memory. Processing hardware, such as a CPU, Ethernet hardware engine, classification hardware engine, security hardware engine, Direct Memory Access (DMA) hardware engine etc., no longer need to access a system memory (Double Data Rate (DDR) to retrieve packet information. Significant performance is gain over conventional cache memory algorithms, as the on-chip memory is an independent addressable memory that does not require a cache snooping algorithm.

Accordingly, a data structure splitting method is provided for processing data using a minimum number of memory accesses in a system-on-chip (SoC). An SoC is provided a with a CPU, a system memory, an on-chip memory (OCM), and a network interface including an embedded DMA. The network interface accepts a data structure with a header and a payload. The network interface DMA writes the payload in the system memory, and writes the header in the OCM. The network interface DMA notifies the CPU of the header address in the OCM and the payload address in system memory. The CPU reads the header in the OCM and performs processing instructions embedded in the header. The CPU writes the processed header in the OCM. Then, the CPU sends the address of the processed header in OCM and the payload address in system memory to the network interface DMA. The network interface DMA reads the processed header from the OCM and the payload from the system memory, and the network interface sends a data structure with the processed header and the payload.

Initially, a classification engine embedded in the network interface determines that no CPU operations are to be performed on the payload, and splits the data structure into header and payload sections, and the network interface DMA writes the header in the OCM in response to the classification engine splitting the data structure.

Additional details of the above-described method and SoC data structure splitting system for processing data using a minimum number of memory accesses are provided below.

BRIEF DESCRIPTION OF THE DRAWINGS

FIG. 4 is a flowchart illustrating an SoC data structure splitting method for processing data using a minimum number of memory accesses.

DETAILED DESCRIPTION

Figure 1:
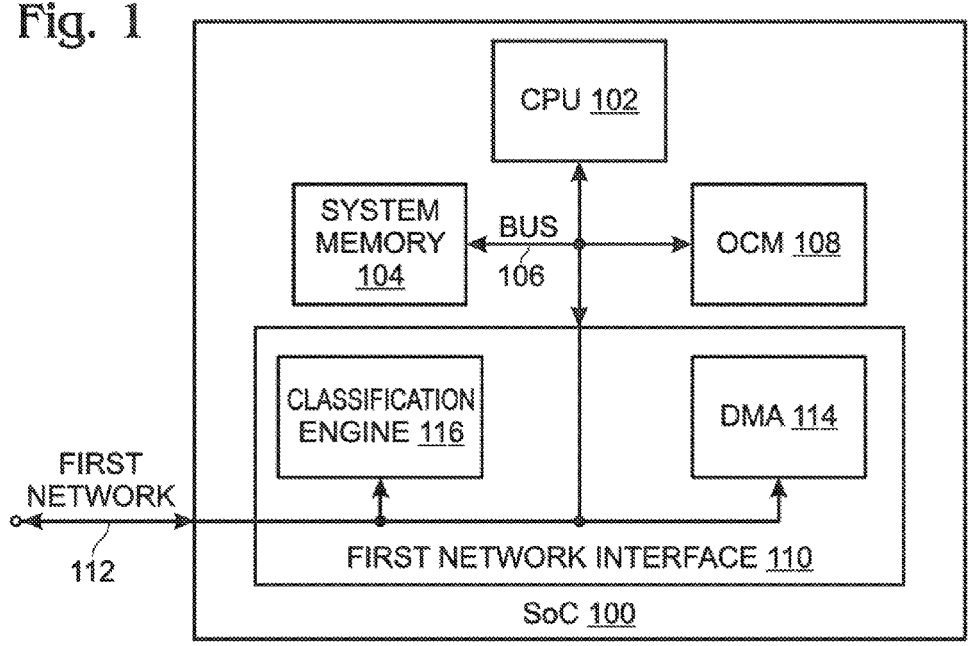
FIG. 1 is a schematic block diagram of a system-on-chip (SoC) data structure splitting system for processing data using a minimum number of memory accesses.

FIG. 1 is a schematic block diagram of a system-on-chip (SoC) data structure splitting system for processing data using a minimum number of memory accesses. The system 100 comprises a central processing unit (CPU) 102, and a system memory 104 connected to the CPU via a data/address bus 106. An on-chip memory (OCM) 108 is also connected to the data/address bus 106. In one aspect, the OCM 108 is a static access random memory (SRAM). For example, the OCM SRAM may have a 128 kilobyte capacity. However, the system is not limited to any particular type of memory or memory capacity.

A first network interface 110 has a connection to an external first network on line 112. The first network interface includes an embedded direct memory access (DMA) 114 connected to the data/address bus 106. The first network interface 110 accepts a data structure on line 112 with a header and a payload. For example, the data structure may have a size of 64 or 128 bytes. In one aspect, the first network interface 110 is an Ethernet hardware module accepting Ethernet packet data structures via the external first network on line 112. However, the system is not limited to any particular protocol, data structure type, or header size.

The first network interface DMA 114 writes the payload in the system memory 104, writes the header in the OCM 108, and notifies the CPU 102 of the header address in the OCM and the payload address in system memory. The CPU 102 reads the header in the OCM 108, performs processing instructions embedded in the header, and writes the processed header in the OCM 108. For example, the CPU 102 may read information from the header such as an Internet Protocol (IP) destination address and/or forwarding instructions.

In a simple form of packet forwarding, unicasting, a packet is relayed from link to link along a chain leading from a packet's source to its destination. However, broadcasting requires that a packet be duplicated and copies sent on multiple links with the goal of delivering a copy to every device on the network. In practice, broadcast packets are not forwarded everywhere on a network, but only to devices within a broadcast domain. With multicasting, a packet is selectively duplicated and copies delivered to each of a set of recipients.

At nodes where multiple outgoing links are available, the forwarding choice for a given packet requires a decision making process. The forwarding decision is generally made using one of two processes: routing, which uses information encoded in a device's address to infer its location on the network, or bridging, which makes no assumptions about where addresses are located and depends heavily on broadcasting to locate unknown addresses.

The CPU 102 sends the address of the processed header in OCM 108, and the payload address in system memory 104, to the first network interface DMA 114. The first network interface DMA 114 reads the processed header from the OCM 108 and the payload from the system memory 104, and the first network interface 110 sends a data structure with the processed header and the payload via the external first network on line 112.

In one aspect, the first network interface 110 further includes an embedded classification engine 116 for splitting the data structure into header and payload sections in response to determining that no CPU operations are to be performed on the payload. The first network interface DMA 114 writes the header in the OCM 108 in response to the first network interface classification engine splitting the data structure. However, if the first network interface classification engine 116 determines that CPU operations are to be performed on the payload, the first network interface DMA 114 writes the header and payload into system memory 104, as is conventional.

Figure 2:
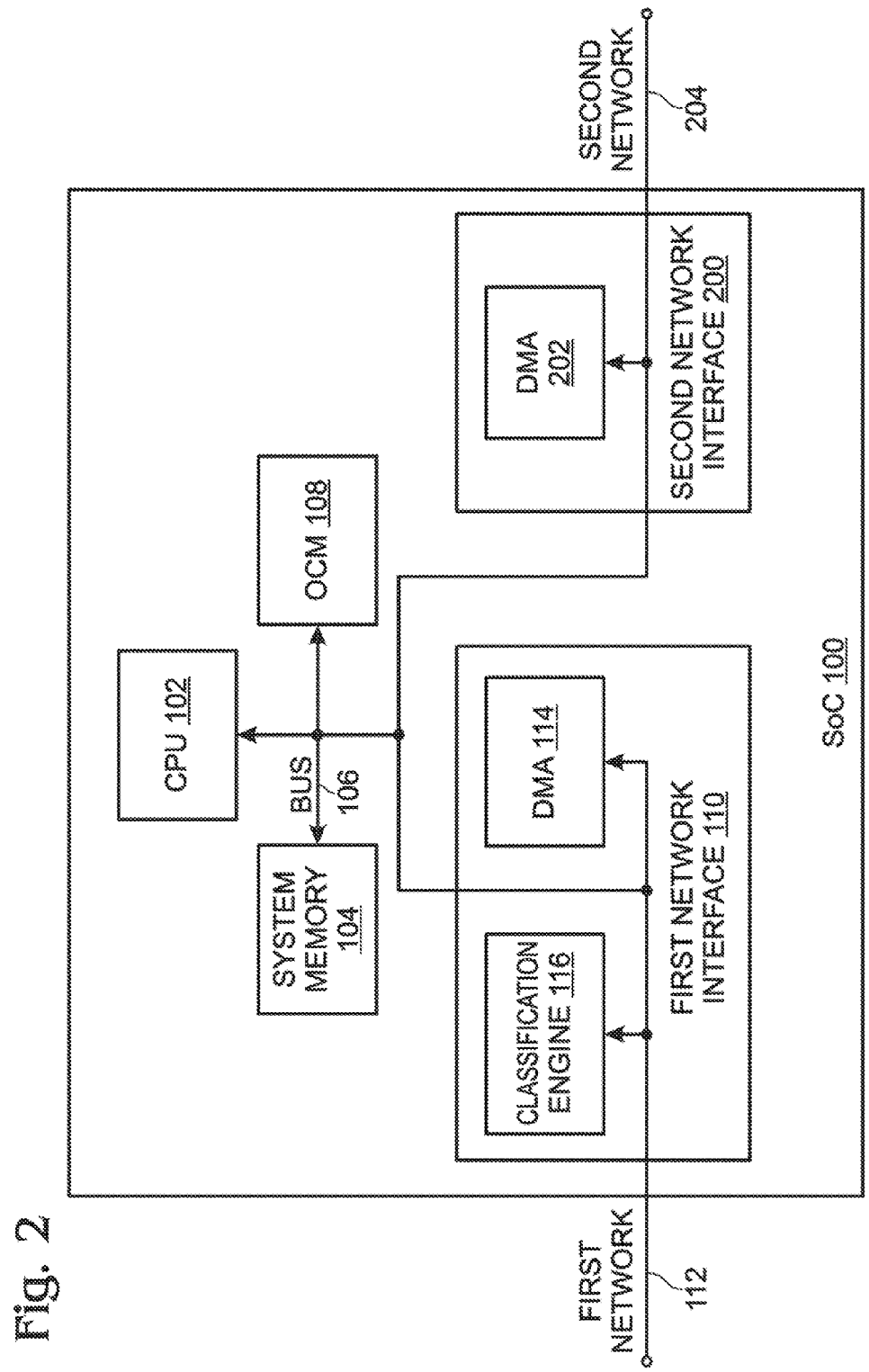
FIG. 2 is a schematic block diagram of a variation of the system depicted in FIG. 1.

FIG. 2 is a schematic block diagram of a variation of the system depicted in FIG. 1. The system further comprises a second network interface 200, including a second DMA 202, connected to an external second network on line 204. In this aspect, the CPU 102 sends the processed header address in the OCM 108, and the payload address in system memory 104, to the second network interface 200. The second network interface DMA 202 reads the processed header from the OCM 108 and the payload from the system memory 104, and the second network interface 200 sends the data structure via the external second network on line 204.

Although only a single CPU is described in the systems of FIGS. 1 and 2, it should be understood that the systems are not limited to any particular number of CPUs. Likewise, the systems are not limited to any particular number of system memories, network interfaces, or OCMs. Further, although the communication flow has been described solely from the first network to the second network, the communications may be bi-directional.

Functional Description

The systems of FIGS. 1 and 2 reduce the memory latency in getting critical data processed. The system is not limited to CPU processing, but also applies to any other hardware blocks that act upon data. With respect to packet forwarding applications for example, the CPU deals mostly with the packet header, without processing packet data. A small memory on chip (i.e. OCM), which can be fast SRAM memory, can be used as a separate addressable memory that is not cacheable. Since the OCM is not cacheable memory, the cache snooping penalty, cache coherency issues, cache flushing, and invalidating latencies are removed.

As fast SRAMs are expensive, it is advantageous to keep the memory as small as possible. Thus, whole packets are not stored in the OCM. To solve this problem, support is added in the hardware to split all the incoming packets in two parts. One part is the header and second is the data. The number of bytes associated with the header portion can be made configurable. For example, depending upon the application, the header might be 64 or 128 bytes. So, if the OCM is 128 kilobytes, as many as 2048 packets can be kept in flight in the system with 64 bytes headers, and 1024 packets with a 128 byte header configuration.

Figure 3:
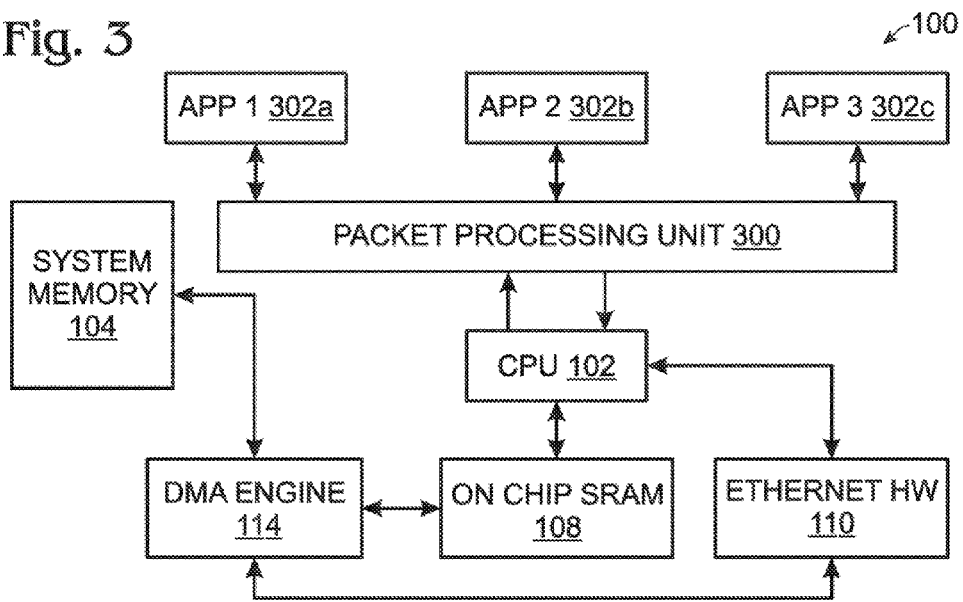
FIG. 3 is a schematic block diagram depicting the system of FIG. 1 with packet processing software.

FIG. 3 is a schematic block diagram depicting the system of FIG. 1 with packet processing software. A packet processing unit 300 is enabled as software instructions stored in memory and executed by the processor 102. Applications (APPs) 302a, 302b, and 302c may support the packet processing unit 300, or require services from the packet processing unit. The applications 302a-302c are also enabled as software instructions stored in memory and executed by the CPU 102. Although not shown, the packet processing unit 300 and applications 302 may be supported by an Operating System (OS).

The system is especially suitable for packet forwarding applications, as the packets reside in system for only a small amount of time. The system need not be used for any packets that are sinking (terminating) in the system. To determine if a packet is to be forwarded or terminated, pre-classifier hardware is used in the network interface (i.e. the Ethernet MAC). If a packet is to be forwarded, a packet splitting mechanism copies the header into the OCM 108 and the data into system memory 104. If the packet is terminated in the node, then conventional methods are used.

If the packet is to be forwarded, the Ethernet MAC hardware uses to DMA 114 to send the packet header to the on-chip memory 108 and rest of the packet data to the system memory 104. The DMA hardware 114 notifies the CPU 102 of the header and data addresses. When the packet is received, the CPU 102 can start processing packets immediately out of the on-chip memory. Since there is no caching involved, the CPU 102 doesn't have to wait for header to come out of system memory into the cache. That process generally takes more than 100 CPU cycles to perform. Every read and write of the header after that does not involve any memory coherency. The CPU software 300 understands that the packet is not contiguous, and represents the packet in fragmented manner in single packet data structure. The packet is processed in this manner for the life of a packet. There is no copying involved in processing the packet.

After the CPU operates on the packet header, and sends the processed header to the on-chip memory 108, the packet needs to be egressed out. The CPU 102 sends the command to DMA engine 114 with two pointers, one for header and other for data. For both of these pointers, the coherency is disabled. Again because of this, there is no need to flush the header to system memory, and no need for DMA controller 114 to wait for the header to be written and read from system memory 104. As the DMA controller 114 has the capability of a gather operation, no additional copies of the packet need be made, to make it contiguous. The packet is just be copied out of the on-chip and system memories directly, without any additional copies. This improves latency and saves system wide bus usage.

FIG. 4 is a flowchart illustrating an SoC data structure splitting method for processing data using a minimum number of memory accesses. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 400.

Step 402 provides an SoC with a CPU, a system memory, an on-chip memory (OCM), and a network interface including an embedded DMA. For example, the OCM may be an SRAM with a capacity of 128 kilobytes. In Step 404 the network interface accepts a data structure with a header and a payload. For example, the network interface may accept a data structure with a header having a size of 64 or 128 bytes. In Step 406 the network interface DMA writes the payload in the system memory, and writes the header in the OCM. In Step 408 the network interface DMA notifies the CPU of the header address in the OCM and the payload address in system memory. In Step 410 the CPU reads the header in the OCM and performs processing instructions embedded in the header. For example, the CPU may be an Internet Protocol (IP) destination address or forwarding instructions.

In Step 412 the CPU writes the processed header in the OCM. In Step 414 the CPU sends the address of the processed header in OCM and the payload address in system memory to the network interface DMA. In Step 416 the network interface DMA reads the processed header from the OCM and the payload from the system memory. In Step 418 the network interface sends a data structure with the processed header and the payload.

In one aspect, a classification engine embedded in the network interface determines in Step 405a that no CPU operations are to be performed on the payload, and in Step 405b the network interface classification engine splits the data structure into header and payload sections. Then, the network interface DMA writing the header in the OCM in Step 406 includes the network interface DMA writing the header in the OCM in response to the classification engine splitting the data structure. Alternatively, in Step 405a the classification engine may determine that CPU operations are to be performed on the payload, and in Step 405c the network interface DMA writes the header and payload into system memory.

In another aspect, Step 402 provides the SoC with a first network interface, including a first embedded DMA, connected to a first network, and a second network interface, including a second DMA, connected to a second network. Then, the network interface accepting the data structure in Step 404 includes the first network interface accepting the data structure via the first network. The CPU sending the address of the processed header in OCM to the network interface in Step 414 includes the CPU sending the address to the second network interface, and in Step 416 the second network interface sends the data structure via the second network.

In one aspect, providing the SoC in Step 402 includes providing the SoC with an Ethernet hardware module network interface. Then, the network interface accepting the data structure in Step 404 includes the Ethernet hardware module accepting an Ethernet packet.

A system and method are provided for splitting data structures, so they can be processed using a minimum number of memory accesses. Examples of the invention have been described through the use of modules and process flows, but the invention is not limited to just these examples. Other variations and embodiments of the invention will occur to those skilled in the art.

We claim:

1. A method for processing data utilizing a system-on-a-chip, comprising:
   receiving on a chip a first data structure comprising a header and a payload from an external network line interface to the chip;
   writing the payload received directly to a system memory on the chip, and writing the header to an on-the-chip memory (OCM);
   notifying a central processing unit (CPU) on the chip of a header address associated with the header and a payload address associated with the payload, the CPU reading the header stored in the OCM, performing processing instructions embedded in the header to generate a processed header, and writing the processed header in the OCM;
   receiving an address of the processed header stored in the OCM and the payload address stored in the system memory;
   reading the processed header from the OCM and the payload from the system memory; and,
   sending a second data structure with the processed header and the payload.

2. The method of claim 1 further comprising:
   determining that no CPU operations are to be performed on the payload;
   splitting the first data structure into the header and the payload; and,
   wherein the writing the header to the OCM comprises writing the header to the OCM in response to the splitting the first data structure.

3. The method of claim 1
   wherein the receiving on the chip the first data structure comprises receiving on the chip the first data structure via a first network interface;
   the receiving the address of the processed header stored in the OCM comprises receiving the address of the processed header via a second network interface; and,
   the sending the second data structure with the processed header and the payload comprises sending the second data structure via a different external network line interface.

4. The method of claim 1 wherein the CPU reading the header stored in the OCM comprises the CPU reading an Internet Protocol (IP) destination address or forwarding instructions stored in the header.

5. The method of claim 1
   wherein the receiving the first data structure comprises receiving an Ethernet packet.

6. The method of claim 1 wherein the header comprises 64 bytes or 128 bytes.

7. The method of claim 1 wherein the writing the header to the OCM comprises writing the header to a static random access memory (SRAM) OCM.

8. The method of claim 7 wherein the SRAM OCM comprises 128 kilobytes.

9. The method of claim 2 further comprising:
determining that CPU operations are to be performed on the payload; and,
writing the header and the payload into the system memory.

10. A system-on-chip (SoC) for processing data, the SoC comprising:
a central processing unit (CPU);
a system memory connected to the CPU via a data/address bus;
an on-chip memory (OCM) connected to the data/address bus;
a first network interface having a connection to an external network, and comprising a direct memory access (DMA) connected to the data/address bus;
wherein the first network interface is configured to receive a first data structure comprising a header and a payload via the external network;
the DMA is configured to write the payload received via the external network directly to the system memory, write the header received via the external network directly to the OCM, and notify the CPU of a header address associated with the header and a payload address associated with the payload;
the CPU is configured to read the header in the OCM, perform processing instructions embedded in the header to generate a processed header, write the processed header in the OCM, and send the address of the processed header in the OCM and the payload address in the system memory to the DMA;
the DMA is configured to read the processed header from the OCM and the payload from the system memory; and,
the first network interface is configured to send a second data structure with the processed header and the payload via the external network.

11. The SoC of claim 10 wherein the first network interface is further configured to split the first data structure into the header and the payload in response to determining that no CPU operations are to be performed on the payload; and,
the DMA is configured to write the header received via the external network directly to the OCM in response to the first data structure being split into the header and the payload.

12. The SoC of claim 10 further comprising:
a second network interface, comprising a different DMA, connected to a different external network;
wherein the CPU is configured to send the processed header address in the OCM and the payload address in the system memory to the second network interface; and,
the different DMA is configured to read the processed header from the OCM and the payload from the system memory; and
the second network interface is configured to send the second data structure via the different external network.

13. The SoC of claim 10 wherein the CPU is configured to read an Internet Protocol (IP) destination address or forwarding instructions from the header.

14. The SoC of claim 10 wherein the first network interface is an Ethernet hardware module that is configured to receive Ethernet packet data structures via the external network.

15. The SoC of claim 10 wherein the first network interface is configured to accept a data structure with a header comprising 64 bytes or 128 bytes.

16. The SoC of claim 10 wherein the OCM is a static access random memory (SRAM).

17. The SoC of claim 16 wherein the SRAM comprises 128 kilobytes.

18. The SoC of claim 11 wherein the first network interface is configured to determine that CPU operations are to be performed on the payload; and,
the DMA is configured to write the header and the payload into the system memory.

19. A system-on-chip (SoC) data structure splitting system for processing data using a minimum number of memory accesses, comprising:
a central processing unit (CPU);
a system memory connected to the CPU via a data/address bus;
an on-chip memory (OCM) connected to the data/address bus;
a first network interface having a connection to an external network line, and comprising a direct memory access (DMA) connected to the data/address bus;
wherein the first network interface is configured to receive a data structure with a header and a payload via an external network line;
the DMA is configured to write the payload received via the external network line directly to the system memory, write the header received via the external network line directly to the OCM, and notify the CPU of a header address associated with the header and a payload address associated with the payload;
the CPU is configured to read the header in the OCM, perform processing instructions embedded in the header to generate a processed header, write the processed header in the OCM, and send the address of the processed header in the OCM and the payload address in the system memory to the DMA;
the DMA is configured to read the processed header from the OCM and the payload from the system memory;
the first network interface is configured to send a new data structure with the processed header and the payload via the external network line;
the first network interface is further configured to split the data structure into the header and the payload in response to determining that no CPU operations are to be performed on the payload; and,
the DMA is configured to write the header received via the external network line directly to the OCM in response to the data structure being split into the header and the payload.

20. The system of claim 19 further comprising:
a second network interface, comprising a different DMA, connected to a different external network line;
wherein the CPU is configured to send the processed header address in the OCM and the payload address in the system memory to the second network interface; and,
the different DMA is configured to read the processed header from the OCM and the payload from the system memory; and the second network interface is configured to send the new data structure via the different external network line.

\* \* \* \* \*